3,484,502
PRODUCTION OF 1,5-HEXADIENE
Donal E. McCarthy, 9104 Chickawane Court,
Alexandria, Va. 22309
No Drawing. Filed Sept. 13, 1967, Ser. No. 667,346
Int. Cl. C07c 3/08
U.S. Cl. 260—680                               1 Claim

ABSTRACT OF THE DISCLOSURE

Process for the production of a hydrocarbon compound containing at least one allylic group which comprises pyrolyzing an allylic halide in the presence of a monohalogenated hydrocarbon at a temperature of about 900° F. to 1100° F. and a pressure of about 50 to 300 p.s.i.g.

BACKGROUND OF THE INVENTION

Field of the invention

This invention relates to the production of unsaturated compounds and more particularly to a process for producing hydrocarbon compounds containing allylic groups by pyrolysis of allyl halides in the presence of certain halogenated organic compounds.

Description of the prior art

Unsaturated compounds in general find great application in the prior art as intermediates for a variety of chemical synthesis. For example, a primary utility of such compounds is an intermediate in polymerization reactions. Particular use of diolefinic hydrocarbons are as intermediate products for the production of aliphatic diamines by hydrobromination and subsequent ammonolysis. The resulting diamines, such as hexamethylenediamine, are of course, basic to the preparation of innumerable commercial grades of nylon, and accordingly, a large measure of industrial research effort has been directed to improved processes for their production as well as more economical means for synthesis.

However, the processes heretofore employed for the preparation of the unsaturated hydrocarbon intermediates have been consistenly characterized by attendant disadvantages which considerably detract from their desirability for large scale or commercial use. As examples of these disadvantages there may be mentioned the strong tendencies for undesirable by-product formation with resulting lowered yields of the desired unsaturated hydrocarbon; the stringent process conditions required to be observed for efficacious implementation; the difficulties associated with product isolation, removal and purification, and the like. As a result, the desired unsaturated hydrocarbons are obtained only in limited quantities and at relatively high costs.

As examples of such processes employed heretofore, there may be mentioned the well-known dehydrohalogenation of the corresponding halogen derivatives a method which has not been economically attractive because of the special reaction conditions and catalysts required for implementation. Another method of preparing such products has been by reaction of an organic compound with an unsaturated halide in the presence of a metal such as sodium. However, this process has been equally unattractive as it involves the use of expensive reactants and often results in low yields.

SUMMARY OF THE INVENTION

Accordingly, a primary object of the present invention resides in an improved process for the production of compounds containing allylic groups characterized by improvements in product yield to an extent heretofore unobtainable.

A further object of the invention resides in the provision of a pyrolysis process which eliminates the need for special catalyst systems and the elaborate equipment connected therewith.

A still further object of the present invention resides in the provision of an improved process for the preparation of compounds containing allylic groups by the pyrolysis of an allylic halide wherein the reaction is carried out in the presence of a saturated halogenated hydrocarbon.

Still other and related objects and advantages of the present invention will become apparent from the following description thereof.

In accordance with the present invention, the attainment of the foregoing and related objects is achieved by the provision of a pyrolysis process for the production of compounds containing allylic groups which comprises pyrolyzing an allylic halide in the presence of a monohalogenated hydrocarbon at a molar ratio of about 1:1 to 4:1, respectively, wherein the pyrolysis is conducted at a temperature of about 900° to 1100° F., and a pressure of 50 to 300 p.s.i.g. and recovering the allylic products produced.

It has now been discovered that compounds containing allylic groups may be produced by pyrolysis of an allylic halide in the presence of a mono-halogenated hydrocarbon. The process results in the production of the desired corresponding diallylic products in excellent yields and conversions.

The expression "allylic halide," as used throughout the specification and claims, refers to those organic compounds which possess a double bond between two aliphatic carbon atoms, one of which is joined to an aliphatic carbon atom bearing a labile halogen atom, and which are incapable of splitting out hydrogen halide under the conditions employed in the process. The halogen attached to the aliphatic carbon atom may be any of the halogens such as chlorine, bromine, iodine or fluorine, but, in accordance with the advantageous aspects of the present invention, it is preferred to employ chlorine derivatives. The allylic halides contemplated for use herein may be represented according to the following structural formula:

$$R—CR_1=CR_2—CH_2—X$$

wherein R, $R_1$ and $R_2$ represent hydrogen, alkyl, aryl, alkaryl, aralkyl, etc., preferably hydrogen, and X represents halogen, e.g., chlorine, bromine, iodine or fluorine. Examples of suitable allylic halides include allyl chloride, methallyl chloride, allyl bromide, metallyl bromide, 1-chloro - 3 - phenyl-2-propene, 1-chloro-2,4,4-trimethyl-2- pentene and the like. Of these allylic materials, allyl chloride represents a preferred reactant.

For purposes of illustration, the process of the present invention will be discussed specifically with reference to allyl chloride as the preferred starting allylic halide. However, it will be understood that other allylic halides of the type encompassed by the above formula may be similarly employed.

The halogenated compounds to be employed in the process in combination with the above-described allylic halides comprise the halogenated hydrocarbons of the following formula:

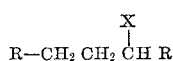

wherein R is selected from the group consisting of hydrogen, branched- or straight-chained alkyl, aryl, alkaryl, aralkyl groups, etc., and X is a halogen such as chlorine, bromine, iodine or fluorine. It will be appreciated that other substituents may be present in the R group position as long as they are essentially non-reactive and do not otherwise deleteriously affect the novel process. Examples of such halogenated compounds include 1-chloropropane, 1-bromopropane, 1 - chlorobutane, 1-chloro-3-phenyl-propane, etc. An especially preferred material is 1-chloropropane and this compound is employed in the following description. However, it will be understood that other compounds encompassed by the above formula may also be employed.

The novel process of the invention is predicated on the surprising discovery that under the specific pyrolysis conditions of this invention, the allylic halide and halogenated hydrocarbon undergo dissociation to yield allylic radicals which subsequently combine to form diolefins in good conversions.

The diolefin products produced in accordance with the novel pyrolysis process of the invention comprise the compounds formed by coupling of the allyl radical and the radical formed by pyrolysis of the halogenated hydrocarbon. In the case of the pyrolysis of allyl chloride and 1-chloropropane, the resulting diolefin is 1,5-hexadiene, commonly known as diallyl, a well known intermediate in the production of nylon. Analogous products are of course formed employing different starting materials.

The process of the invention is thus a general method for coupling allylic radicals to other organic radicals through the technique of subjecting the compounds to the pyrolysis conditions set forth hereinafter. It therefore follows that by merely varying the type of allylic halide and halogenated hydrocarbon starting material, there can be produced a great variety of unsaturated compounds.

The method of the invention is particularly attractive for large scale production of desirable olefinic hydrocarbon products as it avoids the use of special catalyst systems and difficult reaction conditions. In general, the method of the invention presents a process which affords a greater recovery of the desired olefins while permitting the use of relatively inexpensive starting materials as compared to methods attempted heretofore.

In conducting the process of the present invention, the allylic halide feed is contacted with the halogenated hydrocarbon reactant in a reactor maintained at temperatures of about 850° F. to about 1100° F. Preferred temperatures for the reaction generally range from about 900° F. to 1050° F. and more preferably from about 1000° F. to about 1050° F.

The pressure employed in the reaction zone may likewise vary over a wide range, i.e., from sub-atmospheric to superatmospheric as desired. However, the most effective pressure found conducive for convenience of process operation is about 50 to 300 p.s.i.g.

The relative proportions of the respective components should be such as to yield a mixture comprising the allylic halide and halogenated hydrocarbon in at least equimolar amounts. Optimum results are achieved wherein the molar ratio of allylic halide to halogenated hydrocarbon is maintained in the range of from about 1:1 to about 4:1. In general, however, higher ratios of the allylic halide to the mono-halogenated hydrocarbon result in increased conversions and yields.

The residence period for substantial completion of the reaction will depend, inter alia, on the desired degree of conversion of the allylic halide and halogenated hydrocarbon, which in turn depends on the reaction conditions and nature of the reactants. In general, however, it has been found that the desired conversion per pass can be obtained in periods ranging from about 0.1 to about 50 seconds at the preferred temperatures of about 900° F. to 1100° F.

The components may be pre-mixed prior to entry into the pyrolysis zone or they may be added separately. In general, however, it is preferable to pre-mix the components to insure thorough contact during the reaction. It is also generally advantageous and desirable to pre-heat the components separately or in admixture to a temperature below the operating temperature prior to entry into the reaction zone.

On completion of the reaction, the product gases withdrawn from the reaction zone are cooled, condensed and scrubbed or otherwise treated to remove the hydrogen chloride generated in the pyrolysis reaction. Thereafter, the diolefins may be recovered by any suitable means such as fractional distillation, extraction, etc. Any allylic halide or halogenated hydrocarbon starting materials which are recovered may be conveniently recycled to the reaction zone in admixture with fresh feed in operating a continuous process.

A preferred reaction apparatus for conducting the process comprises a stainless steel tube of suitable dimensions inserted in an electrical heater. However, it is to be understood that any suitable reaction apparatus may be employed in carrying out the process of the invention.

The following examples illustrate the results obtained when proceeding according to the method of this invention and represent specific embodiments thereof.

EXAMPLE 1

The reactor employed in this experiment comprised a stainless steel tube having an inside diameter of one-inch and having a one-fourth inch diameter thermowell inserted down the center thereof. The tube was forty-three inches long. Proper heating was effected by insertion of the tube into an electrical heater.

Allyl chloride and 1-chloropropane were pre-mixed in a molar ratio of 2:1 and the mixture passed into a pre-heat tube maintained at 600° F. Thereafter the pre-heated mixture was passed into the reaction zone proper which was maintained at a temperature of 1010° F. and a pressure of 75 p.s.i.g. The product gases were removed from the bottom of the reactor and the hydrogen chloride removed by use of a water trap. The organic product, retained in a Dry Ice trap, was fractionally distilled to isolate and recover unreacted allyl chloride, 1-chloropropane and the desired diallyl. Analysis indicated a 58% conversion of the allyl chloride and a diallyl yield of 67.6%.

EXAMPLE 2

The apparatus employed in this example is the same as in Example 1.

Allyl chloride and 1-chloropropane were pre-mixed in a molar ratio of 4:1 and the mixture passed into a pre-heat tube maintained at 600° F. Then the pre-heated mixture was passed into the reaction zone proper wherein the temperature was maintained at 1018° F. at a pressure of 75 p.s.i.g. At the conclusion of the reaction, the effluent product gases were removed from the bottom of the reactor, and the hydrogen chloride removed by means of a water trap. The organic product, retained in a Dry Ice trap, was thereafter fractionally distilled to isolate and recover unreacted allyl chloride, 1-chloropropane and the desired diallyl product.

On analysis of the reaction product, it was found that there had been a 67% conversion of the allyl chloride with attainment of a yield of diallyl of 76.3%.

The invention has been described with respect to only certain preferred embodiments thereof with others becoming obvious to persons skilled in the art. Therefore, the invention is not to be construed as limited except as by the appended claim insofar as the state of the art permits.

What is claimed is:

1. A process for preparing diallyl which comprises pyrolyzing a mixture of allyl chloride and 1-chloropropane in a molar ratio of from 1:1 to about 4:1 at a temperature of from about 900° F. to 1100° F. and at a pressure of about 50 to 300 p.s.i.g.

References Cited

UNITED STATES PATENTS

| | | | |
|---|---|---|---|
| 1,975,456 | 10/1934 | Hass et al. | 260—677 X |
| 2,755,322 | 7/1956 | Rust et al. | 260—680 |
| 2,948,760 | 8/1960 | Capp et al. | 260—680 X |
| 3,414,622 | 12/1968 | Hayes | 260—680 X |

PAUL M. COUGHLAN, Jr., Primary Examiner